United States Patent
Cootes et al.

(10) Patent No.: US 7,295,709 B2
(45) Date of Patent: Nov. 13, 2007

(54) OBJECT IDENTIFICATION

(75) Inventors: Timothy F. Cootes, Stockport (GB); Christopher J. Taylor, Stockport (GB)

(73) Assignee: The Victoria University of Manchester, Manchester (GB)

( * ) Notice: Subject to any disclaimer, the term of this patent is extended or adjusted under 35 U.S.C. 154(b) by 650 days.

(21) Appl. No.: 10/478,714

(22) PCT Filed: May 24, 2002

(86) PCT No.: PCT/GB02/02228

§ 371 (c)(1), (2), (4) Date: Mar. 31, 2004

(87) PCT Pub. No.: WO02/097720

PCT Pub. Date: Dec. 5, 2002

(65) Prior Publication Data

US 2004/0170323 A1   Sep. 2, 2004

(30) Foreign Application Priority Data

May 25, 2001  (GB) ............... 0112773.7

(51) Int. Cl.
*G06K 9/48* (2006.01)
*G06K 9/00* (2006.01)

(52) U.S. Cl. .............. 382/199; 382/103; 382/118
(58) Field of Classification Search ........... 382/197, 382/199, 201, 203
See application file for complete search history.

(56) References Cited

U.S. PATENT DOCUMENTS 5,142,592 A   8/1992  Moler

FOREIGN PATENT DOCUMENTS

WO   WO 92/15150   9/1992
WO   WO 01/82787 A2   11/2001

OTHER PUBLICATIONS

Froeba B et al., "Face Detection and Tracking Using Edge Orientation," Dec. 2000, Proceedings of SPIE, vol. 4310, pp. 583-594.*
Froeba et al., "Face Detection and Tracking Using Edge Orientation Information", Proceedings of the SPIE, vol. 4310, Dec. 2000, pp. 583-594.
Cootes et al., "Comparing Active Shape Models with Active Appearance Models", Proc. British Machine Vision Conference, vol. 1, 1999, pp. 173-182.
Chakraborty et al., "Deformable Boundary Finding in Medical Images by Integrating Gradient and Region Information", IEEE Transactions on Medical Imaging, Dec. 1996, pp. 859-870.
Worring et al., "Parameterized Feasible Boundaries in Gradient Vector Fields", Computer Vision and Image Understanding, Academic Press, Voll 63, No. 1, 1996, pp. 135-144.
Bakker et al., "Edge Preserving Orientation Adaptive Filtering", 1999 IEEE, pp. 535-540.
Du Buf et al., "A Quantitative Comparison of Edge-Preserving Smoothing Techniques", Elsevier Science Publishers B.V, 1990, pp. 289-301.
Saint-Marc et al., "Adaptive Smoothing: A General Tool for Early Vision", 1991 IEEE, pp. 514-529.

* cited by examiner

*Primary Examiner*—Jingge Wu
*Assistant Examiner*—John W Lee
(74) *Attorney, Agent, or Firm*—Nixon & Vanderhye P.C.

(57) ABSTRACT

A method of object identification comprising, for an image in which an object is to be identified, determining for each of a set of location in the direction in which the gradient of intensity change to an adjacent location is greatest together with the magnitude of that gradient, modifying the gradient magnitude using a nonlinear function, the modified gradient and the associated direction for the set of location providing a vector representative of the image, and comparing the vector with a previously generated statistical model which provides identification of the object.

23 Claims, 1 Drawing Sheet

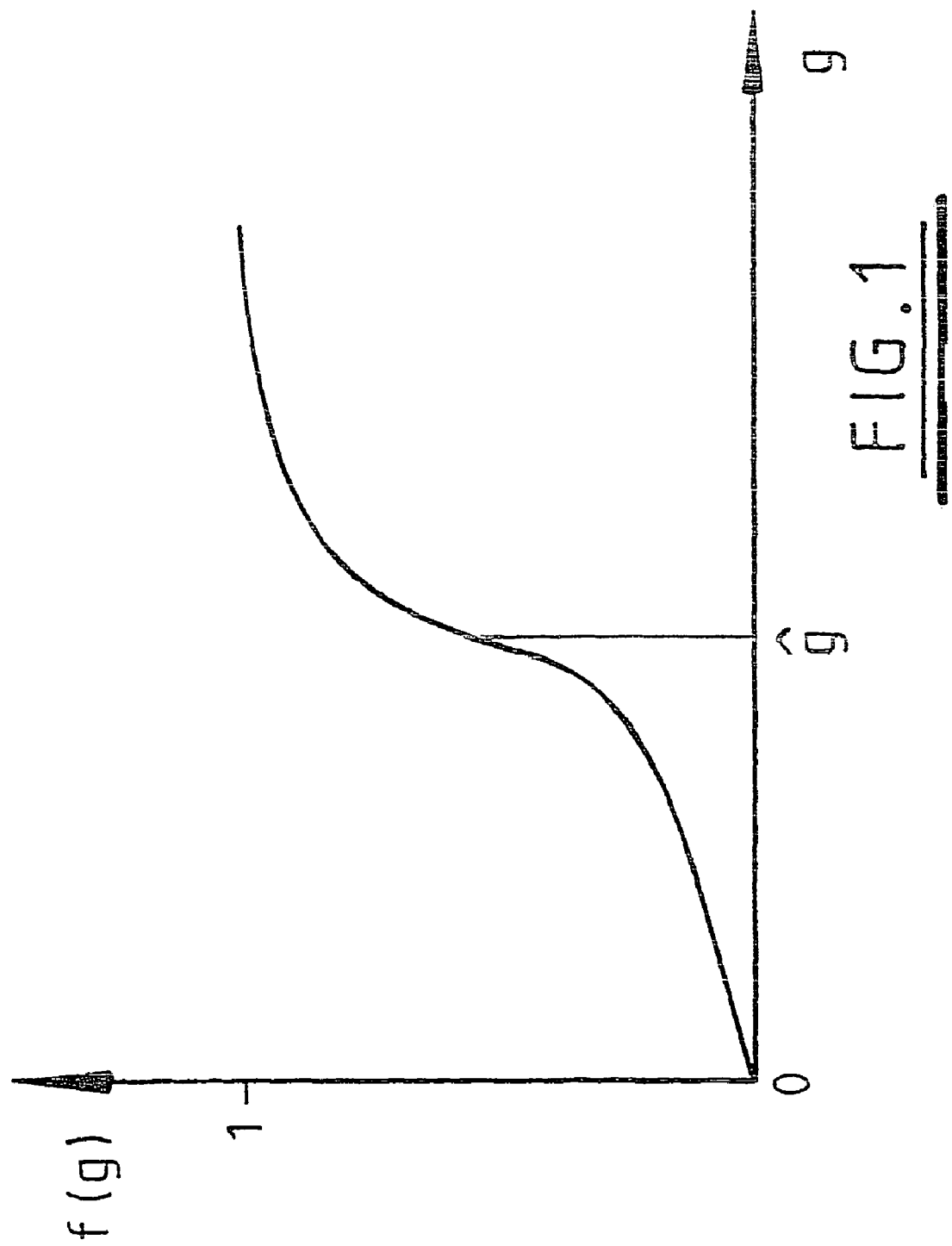

US 7,295,709 B2

OBJECT IDENTIFICATION

This application is the U.S. national phase of international application PCT/GB02/02228, filed May 24, 2002, which designate the U.S.

BACKGROUND

1. Technical Field

Statistical models of appearance are widely used in computer vision and have many applications, including interpreting medical images and interpreting images containing faces.

2. Related Art

Conventionally, a statistical model is built which represents intensity (greyscale or colour) variation across an image or part of an image. In the case of a facial appearance model, images of many faces are used to generate the model, these images being known as training images. The intensity variation that is likely to be seen in any given face will tend to include similar patterns, and the statistical model represents these patterns. Once the statistical model has been built it may be used to determine whether a new image includes a face, by determining whether the new image contains the facial intensity patterns. The identity of the face in the image may be determined by comparing the intensity patterns found in the image with identity patterns of known faces. A positive identification is given if a suitable error measure, such as a sum of squared error metric, is below a predetermined threshold value.

There are several known methods of generating statistical appearance models, and using the models to identify and/or recognize faces or other objects in images. Two known models, the Active Shape Model (ASM) [3,4] and the Active Appearance Model (AAM) [2] were developed at the Victoria University of Marichester, United Kingdom and have been widely used. Both of these models are based upon the use of normalized intensity values. The ASM and the AAM are both generalizations of eigen-face models [6]. Eigenface models are also based upon the use of intensity values and have also been widely used.

A disadvantage of statistical appearance models that are based upon intensity variation information is that these models are prone to function incorrectly in the presence of changing lighting effects. For example, a face illuminated from an angle different to the illumination which was used when generating the model may cause an error.

It is Known to generate an ASM using images to which a non-linear filter has been applied. One such filter is arranged to locate edges in a given image, and then set to zero the intensity of everything that is not an edge (this is known as the Canny Edge Operator). The same filter is applied to a new image when the ASM is used to identify and/or recognise an object in the image the output of the filter is a pair of images, one of which represents the directions of edges of the image, and the other represents the magnitude of the edges. This method suffers from two disadvantages. The first disadvantage is that the resulting images are binary images, each edge being represented by 'on' values, with the result that a significant amount of information relating to the image is lost. In particular, information relating to structure close to the edges is lost. The second disadvantage of the method is that the filter parameters remain the same for every area of each image, and remain the same for every image. Although it is possible to adjust the filter parameters, tile method does not provide any measurement upon which to base any adjustment.

BRIEF SUMMARY

It is an object of the present invention to provide an appearance model which overcomes or mitigates at least one of the above disadvantages.

According to an exemplary embodiment of the invention there is provided a method of object identification comprising, for an image in which an object is to be identified, determining for each of a set of locations in the image the direction in which the gradient of intensity change to an adjacent location is greatest together with the magnitude of that gradient, modifying the gradient magnitude using a nonlinear function, the modified gradient and the associated direction for the set of locations providing a vector representative of the image, and comparing the vector with a previously generated statistical model which provides identification of the object.

The term 'image' is intended to mean an image or a region of the image which is of interest. The locations of interest in the image may be selected regions which are expected to provide inflation useful for identification.

Suitably, the nonlinear function maps the magnitudes of the gradients to a fixed range of values.

Suitably, the parameters of the nonlinear function are set for a given location or region in the image, depending upon properties of that location or region.

Suitably, one of the properties is the scale of that location or region of the image. Suitably, one of the properties is the orientation of that location or region of the image.

Suitably, one of the properties is the statistics of that location or region of the image.

Suitably, the nonlinear function is the modulus of the gradient magnitude divided by the sum of the gradient magnitude and the mean or median of the expected values of the gradient magnitude.

Suitably, the nonlinear function is a monotonic function representative of the cumulative probability distribution of gradient magnitudes due to effective noise in the image.

Suitably, the effective noise, as represented by noise variance, is obtained from the distribution of the gradient over the image or a region of the image.

Suitably, the effective noise, as represented by noise variance, is pre-computed for the image as a whole.

Suitably, the nonlinear function acts to normalise the gradient magnitude.

Suitably, the direction of the gradient is represented by modulo $2\pi$.

Suitably, the direction of the gradient is represented by modulo $\pi$.

Suitably, the location and size of an object of interest is estimated prior to determining the gradient directions and magnitudes.

Suitably, the method provides identification of the class of an object.

Suitably, the method provides recognition of a particular object within a class of objects.

Suitably, the class of objects is faces.

Suitably, the previously generated appearance model is an Active Shape Model.

Suitably, the Active Shape Model uses profile models.

Suitably, the profile models are one-dimensional models.

Suitably, the previously generated appearance model is Combined Appearance Model.

Suitably, the previously generated appearance model is an Active Appearance Model.

The exemplary embodiment of the invention also provides an appearance model comprising a set of data representative of images of objects of interest, the model being constructed by determining for each of a set of locations in the image the direction in which the gradient of intensity change to an adjacent location is greatest together with the magnitude of that gradiet, modifying t&e gradient using a nonhnear function, and combining die resulting set of modified gradients and associated directions with sets of modified gradients and associated directions determined for other images, to form the set of data.

BRIEF DESCRIPTION OF THE DRAWINGS

A specific embodiment of the invention will now be described by way of example only with reference to the accompanying figures, in which:

FIG. 1 is a graph which represents a weighting function used by the first embodiment of the invention.

DETAILED DESCRIPTION OF EXEMPLARY EMBODIMENTS

A first embodiment of the invention is based upon the Active Shape Model (ASM) [4], which is described in detail in Appendix 1. The known prior art ASM comprises a statistical model of the intensity of the image at each model point.

The first embodiment of the invention, instead of simply using intensity measurements, represents the image structure as a gradient, which is specified as a magnitude and an orientation. For any given pixel, the orientation of the gradient indicates the direction of greatest intensity change when moving from that pixel to an adjacent pixel. Where an edge of a feature passes through or adjacent the pixel, the direction of the gradient will be transverse to the edge. The magnitude of the gradient provides a measure of belief in the accuracy of the measurement (in other words a measure of belief that an edge is present). Essentially the measure is strong when on a well defined edge, since the orientation of the gradient is well defined, but is weak or zero in essentially flat noisy regions of the image. Use of the gradient instead of intensity information is advantageous because it provides inherent identification of edges in images.

The gradient for a given pixel is operated on by a nonlinear filter, and is then added to the ASM (during ASM generation). This is in marked contrast to the known prior art in which a nonlinear filter is applied across an image and the gradient for pixels is subsequently determined.

A first advantage of the invention is that it retains more information than is retained by the prior art ASM. In particular, the filter is not used to locate edges, which by necessity means discarding information relating to areas which are found not to be edges, but instead is used to provide gradient information relating to an entire image (information does not need to be discarded). The nonlinear filter acts to suppress the importance of information that is less likely to relate to an area of interest of the image.

A second advantage of the approach used by the invention is that the parameters of the filter are easily adjusted for the particular region of the image being explored. In particular, when searching a cluttered image for an example of the object of interest, the parameters of the normalisation function are chosen based on the statistics of the image in the region being explored launder the current estimate of model position, rather than on the statistics of the image as a whole. This provides a substantial improvement over the prior art, where a single set of filter parameters is used for the whole image.

When generating an ASM, be it the prior art ASM or the ASM according to the invention, locations of importance are manually marked on each image which is added to the ASM (this is described in Appendix 1). Where the ASM models faces, the locations of interest include the comers of the mouth, the comers of the eyes, etc. Since the location of the features of interest is known, this allows the parameters of the filter to be adjusted for different areas of the image. For example, for a face model the filter parameters may be set to suppress the effect of pixels located immediately outside the comers of the mouth since these pixels are unlikely to include significant useful information (the pixels represent the cheeks). Similarly, the filter parameters may be set to enhance horizontal edges located between the comers of the mouth since these pixels are likely to include very useful information (the pixels represent the mouth). Since the orientation of the face is known, from the orientation of the marked up points, any rotation of the face may be corrected before it is filtered.

When using the ASM to locate an object of interest in a new image, the filter parameters are again adjusted in the same way that they were adjusted during ASM generation. Once the initial location, scale and orientation of an object of interest have been determined (a method of doing this is described in Appendix 2), the filter parameters are set depending on the scale, orientation and statistics of the image in the region around the current estimate of position.

The appearance model represents image structure in regions around the object of interest. In the case of the ASM this is a set of small regions around each model point, either a profile normal to the boundary at the point or a small 2D region around the point.

During both model generation and searching of a new image, the image of interest is sampled over each region of interest, the sample values being placed in a vector representing the image structure in the region. In prior art ASM's this was commonly simply a case of taking the intensity values at each pixel in the region and placing them in the vector. The first embodiment of the invention uses the following approach to represent each region with a vector:

1. Estimate the local gradients at a point x in x and y. The gradient is determined by first applying an edge filter in x (essentially convolving with a (−101) filter), then in y. This provides gradient values $g_x$, $g_y$ for each point x. The direction in which the gradient is a maximum is given by the vector ($g_x$, $g_y$).
2. Compute the magnitude of the gradient, $g=\sqrt{g_x^2+g_y^2}$
3. Apply a non-linear function, f(g, x,) to obtain a representation of gradient direction and strength, $(g'_x, g'_y)$=f(g, x)($g_x/g$, $g_y/g$).
4. Add the values $g'_x$, $g'_y$ to a feature vector containing values representative of the region.
5. Repeat for all points n the region.

All other steps of model building remain unchanged from the prior art, as described in Appendix 1, and the listed references. The steps are:

6. Add the feature vector to the ASM.
7. Repeat for a large number of regions, the number of regions required being determined by the quality of the statistics of the model.

The orientation of the gradient is represented as modulo $2\pi$ (i.e. an angle between zero and $2\pi$). The directions along which the gradients are measured are defined in the model frame, to ensure that the method is independent of the rotation and scale of the model instance in the image.

When adding values to the new Active Shape Model (ASM), the normalised intensity feature vector g, which in the prior art ASM is a concatenation of all the intensity values for a given image, is replaced with a feature vector twice as long, of the form $g^T=(\ldots g'_{xi}, g'_{yi}, \ldots)$, a concatenation of all the gradient values for the image. All other calculations for the ASM remain the same.

The non-linear function $f(g, x)$ is chosen so as to accentuate likely edges and suppress structure which is likely to be noise. If the function were not used then the values input to the ASM would simply be gradients. Tests have shown that the use of unmodified gradients will provide an ASM which has an unimproved performance compared to the known intensity value based ASM.

Without loss of generality, $0 \leq f(g, x) \leq 1$ for all g, i.e. the nion-linear function provides normalisation to values between 0 and 1 of the gradients. This allows the generation of a statistical model with easily manipulated values. It will be appreciated that normalisation of the gradients between any two values flay be used.

The non-linear function may vary across the image. This may be done for example to suppress non-maximal edges or anticipate different noise properties in different parts of an image. Alternatively, the non-linear function may be independent of position, in which case $f(g, x)=f(g)$.

An effective non-linear function has been found to be $f(g)=|g|/(|g|+g_0)$, where $g_0$ is the mean or median of the expected values of g. In the case of the Active Shape Model, this can be the mean or median of g measured over a region of interest of an image. Different values of $g_0$ may be used for different regions of the image (for example by separating the image into regions, and determining the mean or median separately for each region). The function has the desired property that values of g less than the mean noise value tend to get mapped towards zero and those above the mean (those more likely to be edges of interest) get mapped towards 1. The useful properties of the function stem from the fact that the average gradient will be quite small compared to the maximum gradient; this is because there are likely to be many regions in any given image within which there is little variation of intensity between adjacent points.

An alternative non-linear function is $f(g)=P_n(g)$, where $P_n(a)$ is the cumulative probability distribution of the edge magnitudes due to effective noise in the image. $P_n(a)$ is a monotonic function with a value in [0,1] such that the probability of a random value, b, drawn from a distribution, being less than a given a is $P_n(a)$ (i.e. Prob[b<a]=$P_n(a)$. Again, values of g likely to be due to noise effects are mapped toward zero, those less likely to be noise are treated as interesting structure and are effectively enhanced. Note that if the noise on each pixel is Gaussian. the noise on the derivatives, $g_x$, $g_y$, is also Gaussian and thus $g^2=g_x^2+g_y^2$ will be distributed as $X^2$-allowing an analytic estimate of $P_n(g)$ in terms of gamma functions. An estimate of the noise variance can be obtained from the distribution of g over the sampled region, or can be pre-computed for the image as a whole as appropriate.

The new ASM, once generated, can be used to identify and/or recognise faces or other objects in images. This is done by determining an initial estimated position of the object of interest (described in Appendix 2 below), then performing steps 1 to 5 as set out above to generate a feature vector which is compared to the ASM. The nonlinear filters used, and their associated parameters, are based upon the filters and parameters used to generate the model. Noisy, approximately flat regions in the new image tend to be represented as near zero values and thus have little effect on the optimisation. Experiments have demonstrated that the invention provides more accurate and reliable location of the position of the boundaries of structures of interest in an image, particularly when the target image has significantly different lighting conditions compared to the original training set.

A new image, or region of an image, can be verified as belonging to a particular class by checking that the feature vector is a valid example for that class (i.e. it is 'close enough' to a particular fixed vector, or is sufficiently likely to be generated by a probability density function representing the class).

In some cases it is advantageous to represent the orientation of the edge structure only up to modulo π, essentially identifying the direction of the edge gradient but not its polarity. This is useful in cases where a background of an image is not known in advance. An object of interest in an image may be darker than the background or lighter than the background, so that the position and direction of edges are known, but not their polarity (dark to light or light to dark). This situation can be dealt with by first representing the edge direction in polar co-ordinates, $(g_x, g_y) \rightarrow (g, \theta)$. The angle is then doubled and mapped back: $(h_x, h_y)=(g\cos 2\theta, g\sin 2\theta)=(g_x^2-g_y^2, 2g_xg_y)/g$.

A suitable noin-linear normalisation is then applied as described above:

$$(g'_x, g'_y)=f(g)(h_x/g, h_y/g)=f(g)(g_x^2-g_y^2, 2g_xg_y)/g^2$$

The modulo π data is used to Generate a new Active Shape Model as described above (modulo π and miodulo 2π data are not combined in a single model).

The ASM according to the first embodiment of the invention models the structure of the region about each point using a statistical model of the gradient measured along a profile through the point, orthogonal to the boundary at this position. Where profile models are to be used, they can either represent the structure as described above, with each pixel contributing both an x and y component to the vector, or the model may be used in just one dimension.

Where just one dimension is used, the gradient at a point along the profile is simply measured along the direction of the profile (for instance $g(i)=I(p+u(i+1))-I(p+u(i-1))$ where p is the centre of the profile and u is the step along the profile).

The embodiment of the invention applies a non-linear normalisation to this, $g'(i)=f(g'(i), X)$, where $f(g, x)$ is a suitable non-linear function identical in properties to those described above. This does not contain quite as much information as representing both $g'_x$ and $g'_y$, but is usually faster to compute.

A second embodiment of the invention is based upon the Active Appearance Model (AAM), which is described in detail in Appendix 2. The known prior art AAM uses statistical models of variations of intensity across an object in an image, after first warping the image to correct for shape variability. In the second embodiment of the invention, an image is warped to correct for shape variability, and then instead of using variations of intensity, the non-linearly normalised gradient is used both to generate the new DM and to identify and/or recognise objects using the new AAM.

The appearance model represents image structure in regions around the object of interest. Typically in the case of the AAM this is a 2D region covering all or part of the object.

During both model building and image search, the image of interest is sampled over each region of interest, the sample values being placed in a vector representing, the image structure in the region. In prior art AAM's this was commonly simply a case of taking the intensity values at each pixel in the region and placing them in the vector. The second embodiment of the invention uses the following approach to represent each region within a vector:

For a 2D image, the following steps are performed at each pixel:
1. Estimate the local gradients at a point x in x and v. The gradient is determined by first applying an edge filter in x (essentially convolving with a (−101) filter), then in y. This provides gradient values $g_x$, $g_y$ for each point x. The direction in which the gradient is a maximum is given by the vector $(g_x, g_y)$
2. Compute the magnitude of the gradient, $g=\sqrt{g_x^2+g_y^2}$
3. Apply a non-linear function, $f(g, x)$ to obtain a representation of gradient direction and strength, $(g'_x, g'_y)=f(g, x)(g_x/g, g_y/g)$.
4. Add the values $g'_x$, $g'_y$ to a feature vector containing values representative of the region.
5. Repeat for all points in the region.

All other steps of model building remain unchanged from the prior art, as described in Appendix 1, and the listed references. The steps are:
6. Add the feature vector to the AAM.
7. Repeat for a large number of regions, the number of regions required being determined by the quality of the statistics of the model.

It will be appreciated that features of the first embodiment of the invention which have been described above may be applied to the second embodiment of the invention. For example, the manner in which the filter parameters are adjusted for different areas of an image may be applied to the second embodiment of the invention.

The invention is advantageous because the model generated using, the nonlinear gradient representation is more robust to lighting changes than a straightforward model of raw intensity values. Thus, when used in a classification/recognition framework the invention provides more reliable results.

Appendix 1—the Active Shape Model (ASM)

The first aspect of the invention is based upon the Active Shape Model ([3,4]). To ensure that the manner in which the invention is applied to the Active Shape Model is fully understood, the prior art Active Shape Model is described below:

Active Shape Models are statistical models of the shapes of objects which iteratively deform to fit to an example of the object in a new image. The shapes are constrained by a Statistical Shape Model to vary only in ways seen in a training set of labelled examples.

In addition to the shape model, we require models of the image appearance around each model point. The simplest is to assume the points lie on strong edges. More complex models can be built to represent the statistical variation of the gradient along profiles through the points, normal to the boundary curve at that point.

We assume we have an initial estimate for the pose and shape parameters (eg the mean shape). This is iteratively updated as follows:
  Look along normals through each model point to find the best local match for the model of the image appearance at that point (eg strongest nearby edge)
  Update the pose and shape parameters to best fit the model instance to the found points
  Repeat until convergence The performance can be significantly improved using a multi-resolution implementation, in which we start searching on a coarse level of a gaussian image pyramid, and progressively refine. This leads to much faster, more accurate and more robust search.

The Active Shape Model uses the Statistical Shape Model described below:

Given a set of examples of a shape, we can build a statistical shape model. Each shape in the training set is represented by a set of n labelled landmark points, which must be consistent from one shape to the next. For instance, on a hand example, the 7th point may always correspond to the tip of the thumb.

Given a set of such labelled training examples, we align them into a common co-ordinate frame using Procrustes Analysis. This translates, rotates and scales each training shape so as to minimise the sum of squared distances to the mean oft the set. Each shape can then be represented by a 2n element vector:

$$x=(x\_1, \ldots, x\_n, y\_1, \ldots, y\_n).$$

The aligned training set forms a cloud in the 2n dimensional space, and can be considered to be a sample from a probability density function.

In the simplest formulation, we approximate the cloud with a gaussian. We use Principal Component Analysis (PCA) to pick out the main axes of the cloud, and model only the first few, which account for the majority of the variation.

The shape model is then $$x=x\_mean+Pb$$

where x_mean is the mean of the aligned training examples, P is a 2n ×t matrix whose columns are unit vectors along the principal axes of the cloud, and b is a t element vector of shape parameters.

(This model has been dubbed a "Point Distribution Model" (PDM), but has little to do with the Point Distribution in statistics)

By varying the shape parameters within limits learnt from the training set, we can generate new examples.

Such models are used in the Active Shape Model framework to locate new examples in new images, as described above.

Appendix 2—the Active Appearance Model (AAM)

The second aspect of the invention is based upon the Active Appearance Model (G. Edwards, C. Taylor, and T. Cootes. Interpreting face images using active appearance models. In 3$^{rd}$ *International Conference on Automatic Face and Gesture Recognition* 1998, pages 300-305, Nara, Japan, Apr. 1998. IEEE Computer Society Press) and described further by Cootes et al (T. Cootes, G. J. Edwards, and C. J. Taylor. Active appearance models. In 5$^{th}$ *European Conference on Computer Vision*, pages 484-498. Springer, June 1998). To ensure that the manner in which the invention is applied to the Active Appearance Model is fully understood, the prior art Active Appearance Model is described below:

The Active Appearance Model uses the difference between a reconstructed image generated by the model and the underlying target image, to drive the model parameters towards better values. In a prior learning stage, known displacements, δv, are applied to known model instances and the resulting difference between model and image, δv, is measured. Multivariate linear regression is applied to a large set of such training displacements and an approximate linear relationship is established:

$$\delta c = A \delta v$$

When searching an image, the current difference between model and image, $\delta v$, is used to predict an adjustment, $-\delta c$, to the model parameters which improves model fit. For simplicity of notation, the vector $\delta c$ is assumed to include displacements in scale, rotation, and translation.

The Active Appearance Model is constructed using sets of face images. To do this, Facial appearance models are generated following the approach described by Edwards et al (G. Edwards, A. Laintis, C Taylor and T. Cootes, Statistical model of face images—improving specificity. *Image and Vision Computering*, 16:203-211, 1998). The models are generated by combining a model of face shape variation with a model of the appearance variations of a shape-normalised face. The models are trained on 400 face images, each labelled with 122 landmark points representing the positions of key features. The shape model is generated by representing each set of landmarks as a vector, x and applying a principal component analysis (PCA) to the data. Any example can then be approximated using:

$$x = \bar{x} + P_s b_s \quad (1)$$

where $\bar{x}$ is the mean shape, $P_s$ is a set of orthogonal modes of variation and $b_s$ is a set of shape parameters. Each example image is warped so that its control points match the mean shape (using a triangulation algorithm), and the grey level information g is sampled from this shape-normalised face patch. By applying PCA to this data a similar model is obtained:

$$g = \bar{g} + P_g b_g \quad (2)$$

The shape and appearance of any example can thus be summarised by the vectors $b_s$ and $b_g$. Since there are correlations between the shape and grey-level variations, a further PCA is applied to the concatenated vectors, to obtain a combined appearance model of the form:

$$x = \bar{x} + Q_s c \quad (3)$$

$$g = \bar{g} + Q_g c \quad (4)$$

where c is a vector of appearance parameters controlling both the shape and grey-levels of the model, and $Q_s$ and $Q_g$ map the value of c to changes in the shape and shape-normalised grey-level data. A face can be synthesised for a given c by generating the shape-free grey-level image from the vector g and warping it using the control points described by x (this process is described in detail in [3]). Equations 3 and 4 define a statistical model of appearance known as the Combined Appearance Model.

The 400 examples lead to 23 shape parameters, $b_s$, and 114 grey-level parameters, $b_g$. However, only 80 combined appearance model parameters, c are required to explain 98% of the observed variation.

A two stage strategy is adopted for matching the appearance model to face images. The first step is to find an approximate match using a simple and rapid approach. No initial knowledge is assumed of where the face may lie in the image, or of its scale and orientation. A simple eigen-face model (M. Turk and A. Pentland. Eigenfaces for recognition. *Journal of Cognitive Neuroscience*, 3(1)31-86, 1991) is used for this stage of the location. A correlation score, S, between the eigen-face representation of the image data, M and the image itself, I can be calculated at various scales, positions and orientations:

$$S = |I - M^2|$$

Once a reasonable starting approximation of the position of a face has been determined, the parameters of the appearance model are then adjusted, such that a synthetic face is generated which matches the image as closely as possible. The basic idea is outlined below, followed by details of the alorithm.

Interpretation is treated as an optimisation problem in which the difference between a real face image and one synithesised by the appearance model is mimimised. A difference vector $\delta I$ can be defined:

$$\delta I = I_i - I_m \quad (6)$$

where $I_i$ is the vector of grey-level values in the image, and $I_m$, is the vector of grey-level values for the current model parameters.

To locate a best match between model and image, the magnitude of the difference vector, $\Delta = |\delta I^2|$, is mimimised by varying the model parameters, c.

Since the model has around 80 parameters, this appears at first to be a very difficult optimisation problem involving search in a very high-dimensional space. However, it is noted that each attempt to match the model to a new face image, is actually a similar optimisation problem. Therefore, the model learns something about how to solve this class of problems in advance. By providing a-prior knowledge of how to adjust the model parameters during image search, it arrives at an efficient run-time algorithm. In particular, it might be expected that the spatial pattern in I, to encode information about how the model parameters should be changed in order to achieve a better fit. For example, if the largest differences between the model and the image occurred at the sides of the face, that would imply that a parameter that adjusted the width of the model face should be adjusted.

In adopting this approach there are two parts to the problem: learning the relationship between $\delta I$ and the error in the model parameters, $\delta c$ and using this Knowledge in an iterative algorithm for minimising $\Delta$.

The simplest model that could be chosen for the relationship between $\delta I$ and the error in the model parameters (and thus the correction which needs to be made) is lineal:

$$\delta c = A \delta I \quad (7)$$

This is a good enough approximation to provide good results. To find A, a multiple multivariate linear regression is performed on a large sample of known model displacements, $\delta c$, and the corresponding difference images, $\delta I$. These large sets of random displacements are generated, by perturbing the true model parameters for the images in the training set by a known amount. As well as perturbations in the model parameters, small displacements in 2D position scale, and orientation are also modeled. These extra 4 parameters are included in the regression; for simplicity of notation, they can, however, be regarded simply as extra elements of the vector $\delta c$. In order to obtain a well-behaved relationship it is important to choose carefully the frame of reference in which the image difference is calculated. The most suitable frame of reference is the shape-normalised face patch described above. A difference is calculated thus: for the current location of the model, calculate the image grey-level sample vector, $g_i$, by warping the image data at the current location into the shape-normalised face patch. This is compared with the model grey-level sample vector, $g_m$, calculated using equation 4:

$$\delta g = g_i - g_m \quad (8)$$

Thus, equation 7 can be modified:

$$\delta_c = A \delta g \quad (9)$$

The best range of values of δ c to use during training is determined experimentally. Ideally it is desired to model a relationship that holds over as large a range errors, δ g as possible. However, the real relationship is found to be linear only over a limited range of values. In experiments, the model used 80 parameters. The optimum perturbation level was found to be around 0.5 standard deviations (over the training set) for each model parameter. Each parameter was perturbed from the mean by a value between 0 and 1 standard deviation. The scale, angle and position were perturbed by values ranging from 0 to +/-10% (positional displacements are relative to the face width). After performing linear regression, an $R^2$ statistic is calculated for each parameter perturbatton, $\delta c_i$ to measure how well the displacement is 'predicted' by the error vector δ g. The average $R^2$ value for the 80 parameters was 0.82, with a maximum of 0.98 (the 1st parameter) and a minimum of 0.48.

Given a method for predicting the correction which needs to made in the model parameters, an iterative method may be constricted for solving the optimisation problem. For a given model projection into the image, c, the grey-level sample error vector, δg, is calculated, and the model estimate is updated thus:

$$c'=c-A\delta g \qquad (10)$$

If the initial approximation is far from the correct solution the predicted model parameters at the first iteration will generally not be very accurate but should reduce the energy in the difference image. This can be ensured by scaling A so that the prediction reduces the magnitude of the difference vector, $|\delta g^2|$, for all the examples in the training set. Given the improved value of the model parameters, the prediction made in the next iteration should be better. The procedure is iterated to convergence. Typically the algorithm converges in around 5-10 iterations from fairly poor starting approximations. More quantitative data are given below.

The method was tested on a set of 80 previously unseen face images.

The reconstruction error of AAM search was tested over a test set of 80 unseen images. The reconstruction error for each image was calculated as the magnitude of the shape-normalised grey-level sample vector, $|\delta g|^2$.

REFERENCES

[1] H. Boscli, S. C. Mitchell, P. F. Boudewijn, P. F. Leieveldt, F. Nijland, O. Kamp, M Sonka, and J. Reiber. Active appearance-motion models for endocardial contour detection in time sequences of echocardiograms. In *SPIE Medical Imaging*, Feb. 2001.

[2] T. F. Cootes, G. J. Edwards, and C. J. Taylor. Active appearance models. In H. Burkhardt and B. Neumann, editors, *5th European Conference in Computer Vision*, volume 2, pages 484-498. Springer, Berlin, 1998

[3] T. F. Cootes, A. Hill, C. J. Taylor, and J. Haslam. The use of active shape models for locating structures in medical images. Image and Vision Computing, 12(6):276-285, July 1994.

[4] T. F. Cootes, C. J. Taylor, D. Cooper, and J. Graham. Active shape models—their training and application. *Computer Vision and Image Understanding*, 61 (1):38-59, Jan. 1995.

[5] D. Hond and L. Spacek. Distinctive descriptions for face processing. In *8th British Machine Vision Conference*, volume 1, pages 320-329, Colchester, UK, 1997.

What is claimed is:

1. A method of object identification comprising, for an image in which an object is to be identified, determining for each of a set of locations in the image the direction in which the gradient of intensity change to an adjacent location is greatest together with the magnitude of that gradient, modifying the gradient magnitude using a nonlinear function, the modified gradient and the associated direction for the set of locations providing a vector representative of the image, and comparing the vector with a previously generated statistical model which provides identification of the object.

2. A method of object identification according to claim 1, wherein the nonlinear function maps the magnitudes of the gradients to a fixed range of values.

3. A method of object identification according to claim 1, wherein the parameters of the nonlinear function are set for a given location or region in the image, depending upon properties of that location or region.

4. A method of object identification according to claim 3, wherein one of the properties is the scale of that location or region of the image.

5. A method of object identification according to claim 3, wherein one of the properties is the orientation of that location or region of the image.

6. A method of object identification according to claims 3, wherein one of the properties is the statistics of that location or region of the image.

7. A method of object identification according to claim 1, wherein the nonlinear function is the modulus of the gradient magnitude divided by the sum of the gradient magnitude and the mean or median of the expected values of the gradient magnitude.

8. A method of object identification according to claims 1, wherein the nonlinear function is a monotonic function representative of the cumulative probability distribution of gradient magnitudes due to effective noise in the image.

9. A method of object identification according to claim 8, wherein the effective noise, as represented by noise variance, is obtained from the distribution of the gradient over the image or a region of the image.

10. A method of object identification according to claim 8, wherein the effective noise, as presented by noise variance, is pre-computed for the image as a whole.

11. A method of object identification according to claim 1 wherein the nonlinear function acts to normalize the gradient magnitude.

12. A method of object identification according to claim 1 wherein the direction of the gradient is represented by modulo 2π.

13. A method of object identification according to claim 1, wherein the direction of the gradient is represented by modulo π.

14. A method of object identification according to claim 1, wherein the location and size of an object of interest is estimated prior to determining the gradient directions and magnitudes.

15. A method of object identification according to claim 1, wherein the method provides identification of the class of an object.

16. A method of object identification according to claim 1, wherein the method provides recognition of a particular object within a class of objects.

17. A method of object identification according to claim 1, wherein the class of objects is faces.

18. A method of object identification according to claim 1, wherein the previously generated appearance model is an Active Shape Model.

19. A method of abject identification according to claim 18, wherein the Active Shape Model uses profile models.

20. A method of object identification according to claim 19, wherein the profile models are one-dimensional models.

21. A method of object identification according to claim 1, wherein the previously generated appearance model is a Combined Appearance Model.

22. A method of object identification according to claims 1, wherein the previously generated appearance model is an Active Appearance Model.

23. An appearance model comprising a set of data representative of images of objects of interest, model being constructed by determining for each of a set of locations in the image the direction in which the gradient of intensity change to an adjacent location is greatest together with the magnitude of that gradient, modifying the gradient using a function, and combining the resulting set of modified gradients and associated directions with sets of modified gradients and associated directions determined for other images, to form the set of data.

* * * * *

UNITED STATES PATENT AND TRADEMARK OFFICE
CERTIFICATE OF CORRECTION

| | | |
|---|---|---|
| PATENT NO. | : 7,295,709 B2 | Page 1 of 1 |
| APPLICATION NO. | : 10/478714 | |
| DATED | : November 13, 2007 | |
| INVENTOR(S) | : Cootes et al. | |

It is certified that error appears in the above-identified patent and that said Letters Patent is hereby corrected as shown below:

Please correct Title Page of Patent, Assignee Item [73] as shown below:

Please correct the assignee "The Victoria University of Manchester, (Manchester, GB)" to read: --The University of Manchester, (Manchester, GB)--

Signed and Sealed this

Thirty-first Day of March, 2009

JOHN DOLL
*Acting Director of the United States Patent and Trademark Office*